Patented Dec. 14, 1948

2,456,565

UNITED STATES PATENT OFFICE 2,456,565

STABILIZED VINYL RESIN

Harold F. Park, East Longmeadow, Mass., assignor to Monsanto Chemical Company, St. Louis, Mo., a corporation of Delaware No Drawing. Application April 25, 1947, Serial No. 744,032

7 Claims. (Cl. 260—78.5)

This invention relates to the art of stabilizing vinyl chloride polymers and copolymers.

The stabilization of vinyl chloride-containing resins has presented a serious problem, particularly with respect to discoloration on exposure to light. It is desirable, if not essential, that light colored articles prepared from such polymers for general use should not be subject to deterioration on exposure to light. Many types of stabilizing materials have been suggested for imparting light stability to vinyl chloride polymers, but relatively few are especially effective and it is desirable that additional and improved stabilizers be available to the art.

It is an object of this invention to provide polymers and copolymers of vinyl chloride with improved resistance to deterioration.

A particular object of this invention is to provide vinyl chloride-containing resins having increased resistance to deterioration on exposure to light.

These and other objects are accomplished according to this invention by intimately mixing tri-parachlorophenyl stibine in a vinyl chloride-containing resin.

The following examples illustrate the invention but are not to be construed as limitative thereof. Where parts are mentioned, they are parts by weight.

The compositions in the examples set forth in the table are prepared by mixing 100 parts of polyvinyl chloride with 50 parts of di-2-ethyl hexyl phthalate and the indicated quantity of stabilizer which is tri-parachlorophenyl stibine (in those examples which include stabilizer). The ingredients are mixed on differential speed rolls at a roll temperature of 290° F. to form a homogeneous composition which is removed from the rolls in the form of crude sheets. From the crude sheets there are molded sheets which are about 0.020 inch in thickness, using a molding cycle of 1 minute at 320° F.

The light stability of the products of the examples is determined by exposure in an Atlas twin-arc weatherometer (3 minutes water spray every 20 minutes) and by exposure to the sun in Florida, as indicated.

The effect of the light exposure is measured by determining light transmission values before and after exposure according to the A. S. T. M. method D-672 44T, using the Kline-Bowen light transmission apparatus.

In the examples in the table, parts by weight of stabilizer are based on every 100 parts by weight of polyvinyl chloride in the composition.

TABLE

| Example | Stabilizer, parts | Light Transmission | | |
|---|---|---|---|---|
| | | No exposure | After 200 hours in weatherometer | After 360 Florida sun hours |
| I | None | 88 | 34 | <8.5 |
| II | 1 | 87 | 88.5 | 82.5 |
| III | 2 | 87.5 | 88 | 81.5 |

It can be readily seen from the values set forth in the table that the stabilized compositions of the invention as illustrated by Examples II and III show a far greater resistance to deterioration on exposure to light than does unstabilized material as shown by Example I. This great improvement in light stability is particularly unexpected in view of the fact that the stabilizer is a chlorinated material. Since it has been theorized that one cause of the deterioration of vinyl chloride polymers is due to splitting out of hydrogen chloride, it would not be supposed that the use of a chlorinated compound would be effective to promote stability. However, contrary to this supposition, paratrichlorophenyl stibine is shown to be a very effective stabilizer and as shown hereinafter, even more effective than non-chlorinated stibines.

Example IV

A mixture of 85 parts of vinyl chloride, 15 parts of diethyl maleate, 0.75 part of benzoyl peroxide and 1 part of triparachlorophenyl stibine was placed in a vessel capable of withstanding pressure. The mixture was polymerized by heating at 55° C. for 72 hours. The product is found to be a water-white, transparent solid. This product forms colorless transparent sheets on molding under heat and pressure. A portion of such a sheet, after exposure to the rays of a mercury vapor lamp for 15 hours is still colorless. Furthermore, a colorless product is also obtained on heating at 155° C. for 10 minutes.

In contrast to the results obtained according to the invention in Example IV, a product polymerized under the same conditions, except that the tri-parachlorophenyl stibine is omitted, is found to have a yellowish-brown color at the end of the polymerization.

In further contrast to the product of Example IV, replacement of the tri-parachlorophenyl stibine with either tributyl or trioctyl stibine yields far less effective results.

Example V

A copolymer of vinyl chloride and vinyl acetate containing about 90% vinyl chloride copolymerized therein is mixed with 2 parts of tri-parachlorostibine for every 100 parts of polymer. The color of a sheet made from this resulting composition is found to be substantially unchanged after exposure to the rays of a mercury vapor lamp for 15 hours, or on heating at 155° C. for 10 minutes.

In contrast to the results in the above example, a sheet of the same copolymer which contains no stabilizer is found to turn from slightly yellow to black after exposure to the rays of a mercury vapor lamp for 15 hours. Also, this product turns black on heating at 155° C. for 10 minutes.

While the amount of the stabilizer which is incorporated in the vinyl chloride-containing polymer may be substantially varied and still result in a surprising improvement in stability, it is usually desirable to have at least 0.5 part of stabilizer for every 100 parts of polymer. Larger amounts of stabilizer than those employed in Examples II and III may be used with somewhat enhanced stabilizing effects. However, it is usually not advantageous to employ more than 5 or 10 parts of stabilizer for every 100 parts of polymer.

Triparachlorophenyl stibine is also effective in stabilizing other vinyl chloride-containing polymers than those used in the illustrative examples. In general, polyvinyl chloride or a copolymer thereof and an unsaturated copolymerizable material may be effectively stabilized with tri-parachlorophenyl stibine. Examples of copolymers of vinyl chloride which may be stabilized in accordance with the invention are such copolymers as those made with vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, ortho-chlorostyrene, para-chlorostyrene, 2,5-dichlorostyrene, 2,4-dichlorostyrene, para-ethyl styrene, divinyl benzene, vinyl naphthalene, alpha-methyl styrene; dienes, such as butadiene, chloroprene; amides, such as acrylic acid amide, acrylic acid anilide; nitriles, such as acrylic acid nitrile; esters of $\alpha,\beta$-unsaturated carboxylic acids, for example, the methyl, ethyl propyl, butyl, amyl, hexyl, heptyl, octyl, allyl, methallyl and phenyl esters of maleic, crotonic, itaconic, fumaric acids and the like. The class of copolymers in which a predominant portion, i. e., more than 50% by weight, of the copolymer is made from vinyl chloride, represents a preferred class of polymers to be treated according to the invention.

A particularly preferred embodiment of the invention comprises the stabilization of polymers prepared by copolymerizing vinyl chloride and an ester of an $\alpha,\beta$-unsaturated dicarboxylic acid such as diethyl maleate, in which 5–20 parts by weight of the ester are used for every 95–80 parts by weight of vinyl chloride. Among the preferred esters of $\alpha,\beta$-unsaturated dicarboxylic acids are the alkyl esters in which the alkyl group contains 2–8 carbon atoms.

The compositions of the invention may be prepared by incorporating the stabilizer before, during or after polymerization. As illustrated by Example IV, presence of the stabilizer during polymerization serves to prevent discoloration during polymerization.

It is obvious that many variations may be made in the processes and products of this invention without departing from the spirit and scope thereof as defined in the appended claims.

What is claimed is:

1. A stabilized polymer from the group consisting of polyvinyl chloride and copolymers of vinyl chloride and unsaturated materials copolymerizable therewith having intimately mixed therewith an amount of tri-parachlorophenyl stibine effective to increase the light-stability of said polymer.

2. A stabilized product as defined in claim 1 in which the polymer is polyvinyl chloride.

3. A stabilized product as defined in claim 1 in which the polymer is a copolymer of vinyl chloride and a vinyl ester of a lower aliphatic acid.

4. A stabilized product as defined in claim 1 in which the polymer is a copolymer of vinyl chloride and vinyl acetate.

5. A stabilized product as defined in claim 1 in which the polymer is a copolymer of vinyl chloride and an ester of an alpha-beta-unsaturated dicarboxylic acid.

6. A stabilized product as defined in claim 1 in which the polymer is a copolymer of vinyl chloride and an alkyl ester of an alpha-beta-unsaturated dicarboxylic acid in which the alkyl group contains 2–8 carbon atoms.

7. A stabilized product as defined in claim 1 in which the polymer is a copolymer of vinyl chloride and diethyl maleate.

HAROLD F. PARK.

REFERENCES CITED

The following references are of record in the file of this patent:

UNITED STATES PATENTS

| Number | Name | Date |
|---|---|---|
| 2,314,466 | Thwaites | Mar. 23, 1943 |

OTHER REFERENCES

Chemical Abstracts, vol. 39, page 694 (1945).